US009643296B2

(12) United States Patent
Tsunoda

(10) Patent No.: US 9,643,296 B2
(45) Date of Patent: May 9, 2017

(54) OPENING-CLOSING TOOL

(71) Applicant: TSUNODA CO., LTD., Tsubame-shi, Niigata (JP)

(72) Inventor: Yuji Tsunoda, Tsubame (JP)

(73) Assignee: TSUNODA CO., LTD., Tsubame-shi (JP)

(*) Notice: Subject to any disclaimer, the term of this patent is extended or adjusted under 35 U.S.C. 154(b) by 315 days.

(21) Appl. No.: 14/413,954

(22) PCT Filed: Jul. 15, 2014

(86) PCT No.: PCT/JP2014/068810
§ 371 (c)(1),
(2) Date: Jan. 9, 2015

(87) PCT Pub. No.: WO2016/002093
PCT Pub. Date: Jan. 7, 2016

(65) Prior Publication Data

US 2016/0271759 A1 Sep. 22, 2016

(30) Foreign Application Priority Data

Jun. 30, 2014 (JP) ................................ 2014-135037

(51) Int. Cl.
*B62B 13/16* (2006.01)
*B25B 7/16* (2006.01)
(Continued)

(52) U.S. Cl.
CPC .................. *B25B 7/16* (2013.01); *B25B 7/06* (2013.01); *B26B 13/16* (2013.01); *B26B 17/00* (2013.01)

(58) Field of Classification Search
CPC .. B25B 7/16; B25B 7/06; B26B 13/16; B26B 17/00
See application file for complete search history.

(56) References Cited

U.S. PATENT DOCUMENTS 64,692 A * 5/1867 Neff, Jr. .................. B26B 13/16 30/262
838,504 A * 12/1906 Hammond .............. B26B 13/16 30/262
(Continued)

FOREIGN PATENT DOCUMENTS

DE 247761 C 6/1912
FR 801724 A 8/1936
(Continued)

OTHER PUBLICATIONS

Communication dated Mar. 8, 2016, from the European Patent Office in counterpart application No. 14821480.2.
(Continued)

*Primary Examiner* — David B Thomas
(74) *Attorney, Agent, or Firm* — Sughrue Mion, PLLC

(57) ABSTRACT

An object of the present invention is to provide an innovative opening-closing tool with extremely high product value. A first half-body 1 having a first operating part 1*a* on the distal end and a first handle part 1*b* on the proximal end and a second half-body 2 having a second operating part 2*a* on the distal end and a second handle part 2*b* on the proximal end have a cross-over pivot, and a biasing body 3 that abuts the second half-body 2 and provides an open bias on the two handle parts 1*b*, 2*b* is provided on the first half-body 1.

5 Claims, 10 Drawing Sheets

(51) Int. Cl.

| | |
|---|---|
| ***B25B 7/06*** | (2006.01) |
| ***B26B 17/00*** | (2006.01) |
| ***B26B 13/16*** | (2006.01) |

(56) References Cited

U.S. PATENT DOCUMENTS

| | | | | | |
|---|---|---|---|---|---|
| 1,802,903 | A | | 4/1931 | Bryant | |
| 1,802,904 | A | | 4/1931 | Bryant | |
| 3,562,908 | A | * | 2/1971 | Rogers | A01G 3/02 30/261 |
| 4,400,876 | A | | 8/1983 | Brown | |
| 4,739,552 | A | | 4/1988 | Thomas | |
| 5,297,343 | A | * | 3/1994 | Melter | B26B 29/04 30/143 |

FOREIGN PATENT DOCUMENTS

| | | | |
|---|---|---|---|
| JP | 46-013679 | Y1 | 5/1971 |
| JP | 49-045883 | Y1 | 12/1974 |
| JP | 61-130159 | U | 8/1986 |
| JP | 2013-013459 | A | 1/2013 |
| JP | 5289513 | B2 | 9/2013 |

OTHER PUBLICATIONS

Foreign International Search Report for PCT/JP2014/068810 dated Sep. 2, 2014.

Foreign Written Opinion for PCT/JP2014/068810 dated Sep. 2, 2014.

Written Opinion dated Mar. 2, 2015, issued by the International Bureau of WIPO in counterpart International application No. PCT/JP2014/068810.

* cited by examiner

OPENING-CLOSING TOOL

CROSS REFERENCE TO RELATED APPLICATIONS

This application is a National Stage of International Application No. PCT/JP2014/068810 filed Jul. 15, 2014, claiming priority based on Japanese Patent Application No. 2014-135037 filed Jun. 30, 2014, the contents of all of which are incorporated herein by reference in their entirety.

TECHNICAL FIELD

The present invention relates to an opening-closing tool for, e.g., a nipper or pliers.

BACKGROUND ART

In the past, nippers with an open biasing function have been offered in which the opening-closing tool is two half-bodies with a cross-over pivot that have handle parts at the proximal ends and cutting parts at the distal ends, with an urging body provided between the half-bodies that urges the two handle parts open. This biasing body is a coil spring that spans between predetermined positions on opposing inner surfaces of the two half-bodies.

Consequently, with nippers having this open-biasing function, simply removing force that is applied to the two handle parts allows the two blades at the distal end parts to open due to the open-biasing of the biasing body. Therefore, opening and closing of the two blade parts can be promptly repeated by an operation in which the two handle parts are gripped firmly and loosely in succession, which is extremely convenient.

However, with nippers having this open-biasing function, the two handle parts cannot be opened more than is necessary, and when the two handle parts are mistakenly opened more than is necessary, problems will occur such as the attachment portion for the half-body will come off, or the biasing body will elongate and break.

Thus, as described in Japanese Unexamined Patent Application Publication No. Sho 61-130159, a nipper has been offered in which an open-biasing structure is provided in which one end part of the biasing body is attached only to one of the half-bodies, and the other end part is made to abut the other half body. With this structure, the problems described above are resolved, but from the standpoint of practical use, there are problems with use if the two handle parts are free to open excessively. In this regard, providing a stopper on the tool may be considered in order to prevent excessive opening of the two handle parts, but this is not realistic because mass production will suffer, causing an increase in cost.

The applicant of this invention has therefore offered an opening-closing tool (referred to below as "conventional example") in Japanese Patent Publication No. 5289513 which resolves the problems described above.

This conventional example has a structure in which a first half-body having a first operating part on the distal end and a first handle part on the proximal end and a second half-body having a second operating part on the distal end and a second handle part on the proximal end have a cross-over pivot, and a biasing body that abuts the second half-body and provides an open bias on the two handle parts is provided on the first half-body. This structure has a configuration in which a recess for latching a distal end part of the biasing body is provided on the second half-body so that, as a result of latching of the biasing body and the recess, the two handle parts are biased open up to a predetermined open position, and, along therewith, opening of the two handle parts is prevented at this predetermined open position. When the two handle parts are additionally opened at a predetermined force from this predetermined open position, the distal end part of the biasing body separates from the recess.

Consequently, with the conventional example, the opening-closing operation is promptly carried out by the open-biasing mechanism, and a recess that latches the distal end part of the biasing body is provided; therefore, excessive opening of the two handle parts is prevented, greatly facilitating use. Moreover, because the distal end part of the biasing body is released from the recess, breakage of the biasing body can be prevented, to as great an extent as possible.

PRIOR ART LITERATURE

[Patent Document 1] Japanese Utility Model Publication No. 61-130159

[Patent Document 2] Japanese Patent Publication No. 5289513

SUMMARY OF THE INVENTION

Problems Which The Invention Is Intended To Solve

The applicants, as a result of continued research and development concerning the opening-closing tool described above, developed a ground-breaking opening-closing tool that manifests actions and effects not seen in the past.

Means Used to Solve the Problems

A summary of the invention is described below with reference to the attached drawings.

The invention is an opening-closing tool, in which a first half-body 1 having a first operating part 1*a* on a distal end and a first handle part 1*b* on a proximal end and a second half-body 2 having a second operating part 2*a* on the distal end and a second handle part 2*b* on the proximal end have a cross-over pivot, and a biasing body 3 that abuts the second half-body 2 and provides an open bias on the two handle parts 1*b*, 2*b* is provided on the first half-body 1, the opening-closing tool characterized in being configured so that a recess part 4 for latching a distal end part 3*a* of the biasing body 3 is provided on the second half-body 2, and, as a result of latching of the biasing body 3 and the recess part 4, the two handle parts 1*b*, 2*b* are biased open up to a predetermined open position, and, along therewith, opening of the two handle parts 1*b*, 2*b* is prevented at this predetermined open position; being configured so that an unlatching part 10 for allowing separation of the distal end part 3*a* of the biasing body 3 from the recess part 4 is provided on the first half-body 1, and the second half-body 2 is provided with a latching part 11 for latching the distal end part 3*a* of the biasing body 3 when the distal end part 3*a* of the biasing body 3 is made to separate from the recess part 4 by the unlatching part 10 and the two handle parts 1*b*, 2*b* have closed to a predetermined closed position, the two handle parts 1*b*, 2*b* being kept closed by latching of the distal end part 3*a* of the biasing body 3 on the latching part 11; and in being configured so that the biasing body 3 has a configuration in which two plate bodies 3A, 3B are linked with a base part, one of the plate bodies 3A being in an attached state at the surface of the first half-body 1, and the distal end part 3*a* of the plate body 3A latching on, or separating from, the recess part 4, and the unlatching part 10 has a configuration in which the one of the plate bodies 3A is pressed from the back surface, and, due to this pressing by the unlatching part 10, the distal end part 3*a* that is latched to the recess part 4 is separated from the recess part 4 in opposition to the elasticity of the plate body 3A.

The opening-closing tool according to a second aspect is the opening-closing tool according to the first aspect, characterized in being configured so that one of the plate bodies 3A is latched and held on the latching part 11 due to the elasticity of the one of the plate bodies 3A.

The opening-closing tool according to a third aspect is the opening-closing tool according to the first aspect, characterized in being configured so that a recess-like part is provided as the latching part 11 on one side of the recess part 4 on the second half-body 2.

The opening-closing tool according to a fourth aspect is the opening-closing tool according to the second aspect, characterized in being configured so that a recess-like part is provided as the latching part 11 on one side of the recess part 4 on the second half-body 2.

The opening-closing tool according to a fifth aspect is the opening-closing tool according to any of the first through fourth aspects, characterized in being configured so that the distal end part 3*a* of the biasing body 3 is provided so as to separate from the recess part 4 when the two handle parts 1*b*, 2*b* are opened additionally from a predetermined open position with a predetermined force, an inclined part 5 is provided on another side of the recess part 4 on the second half-body 2, and when the two handle parts 1*b*, 2*b* are closed from a state in which the distal end part 3*a* of the biasing body 3 has separated from the recess part 4, the distal end part 3*a* of the biasing body 3 slides on the inclined part 5, and the distal end part 3*a* latches on the recess part 4.

Effect of the Invention

Due to the configuration described above, the present invention is an innovative opening-closing tool with extremely high product value, whereby opening-closing operations can be promptly carried out by providing a biasing body, and whereby the closed state of the two handle parts can be maintained by utilizing the biasing body.

BEST MODE FOR CARRYING OUT THE INVENTION

Figure 1:
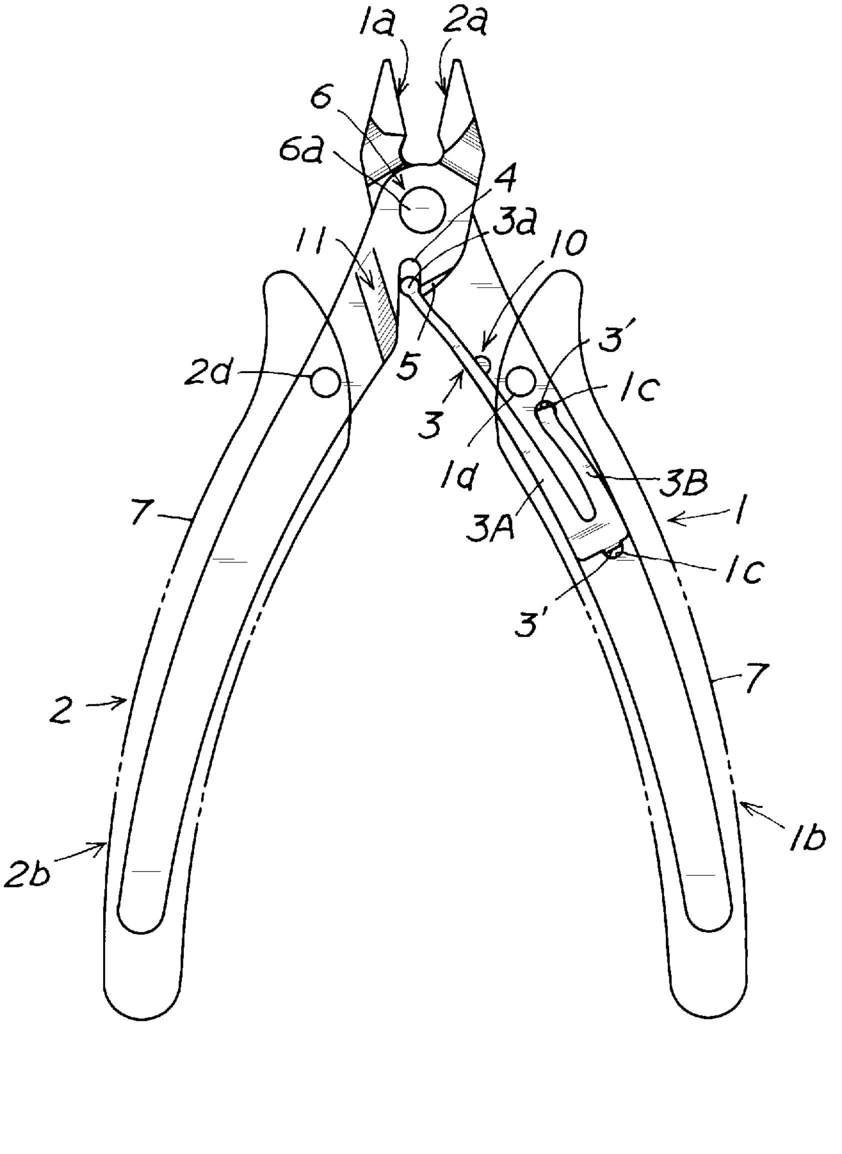
FIG. 1 is a plan view showing a working example.

Preferred embodiments of the present invention are described briefly below with reference to the diagrams while revealing the operation of the present invention.

In the present invention, for example, when the two handle parts 1*b*, 2*b* (first handle part 1*b* and second handle part 2*b*) are closed by a gripping operation, the two operating parts 1*a*, 2*a* (first operating part 1*a* and second operating part 2*a*) close. When the force with which the two handle parts 1*b*, 2*b* are gripped is reduced, the two handle parts 1*b*, 2*b* open due to the open biasing of the biasing body 3, and the two operating parts 1*a*, 2*a* open along therewith.

In addition, in the present invention, a recess part 4 on which the distal end part 3*a* of the biasing body 3 latches is provided on the second half-body 2, and with this configuration, the two handle parts 1*b*, 2*b* are biased open to a predetermined open position by the biasing body 3, and opening of the two handle parts 1*b*, 2*b* is stopped at this predetermined open position.

Consequently, the two handle parts 1*b*, 2*b* are easy to use because opening more than necessary is not possible.

In addition, with the present invention, when the distal end part 3*a* of the biasing body 3 is separated from the recess part 4 due to being pressed by a unlatching part 10 that is provided on the first half-body 1, and, in this state, the two handle parts 1*b*, 2*b* are closed to a predetermined closed position, the distal end part 3*a* of the biasing body 3 latches on the latching part 11 that has been provided on the second half-body 2, and closure of the two handle parts 1*b*, 2*b* is maintained due to latching of the distal end part 3*a* of the biasing body 3 on the latching part 11.

In other words, e.g., when the closed state of the first operating part 1*a* and the second operating part 2*a* is to be maintained, this is achieved by utilizing the biasing body 3 to maintain the closed state of the two handle parts 1*b*, 2*b*. Therefore, a safe stored state is produced when the tool is not being used, and the structure can be described as being extremely efficient.

EXAMPLES

Specific examples of the present invention are described below with reference to the drawings.

In this example, a first half-body 1 having a first operating part 1*a* on the distal end and having a first handle part 1*b* on the proximal end, and a second half-body 2 having a second operating part 2*a* on the distal end and a second handle part 2*b* on the proximal end, have a cross-over pivot, and a biasing body 3 that abuts the second half-body 2 and open-biases the two handle parts 1*b*, 2*b* is provided on the first half-body 1.

Specifically, a pair of long plate-form half-bodies 1, 2 (first half-body and second half-body) made from a suitable metal are provided as illustrated in FIG. 1, with the first half-body 1 and the second half-body 2 pivoting via a shaft member 6*a* at locations towards the distal ends. Handle parts 1*b*, 2*b* (first handle part and second handle part) that are covered with synthetic resin grips 7 are respectively provided at locations towards the proximal ends from the pivot part 6 of the first half-body 1 and the second half-body 2. On the other hand, operating parts 1*a*, 2*a* (first operating part and second operating part) are provided at locations towards the distal ends from the pivot part 6, and, in this example, blade parts are provided as the first operating part 1*a* and the second operating part 2*a*. In this example, blade parts with cutting blades are utilized at respectively opposing locations on the first half-body 1 and the second half-body 2 as the first operating part 1*a* and the second operating part 2*a*, but sandwiching parts whereby an object to be held is sandwiched with flat sandwiching surfaces, for example, may be suitably utilized, provided that the configuration can manifest the characteristics of the example.

Figure 2:
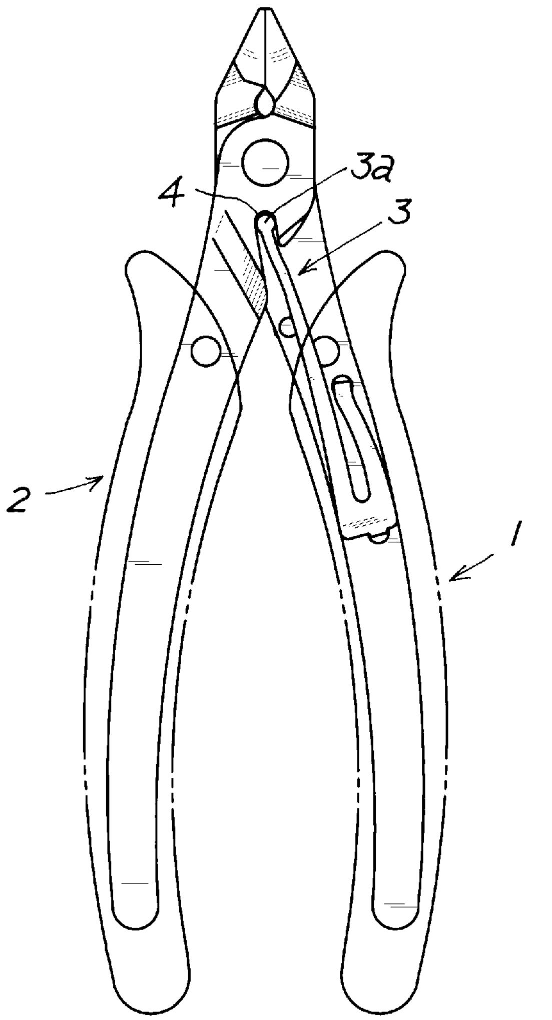
FIG. 2 is an illustrative view of the operation of the essential parts in the working example.

Passage holes 1*c* that pass through the bottom and top surfaces are provided in the first half-body 1 at two sites towards the proximal end from the location of the pivot with the second half-body 2 as shown in FIGS. 1 and 2. The passage holes 1*c* are attachment holes for attaching the biasing body 3 described below.

A recess part 4 is provided in the second half-body at the inner edge part positioned towards the proximal end away from the location of the pivot with the first half-body 1, as shown in FIGS. 1 and 2. This recess part 4 is the location where the distal end part 3*a* of the biasing body 3 described below fits in and latches.

The distal end part 3*a* of the biasing body 3 is circular as seen in plan view, and smoothly separates from the recess part 4 when the two handle parts 1*b*, 2*b* have been opened past the predetermined open position by a predetermined force.

In addition, an inclined part 5 is provided on a side part of the recess part 4.

Figure 3:
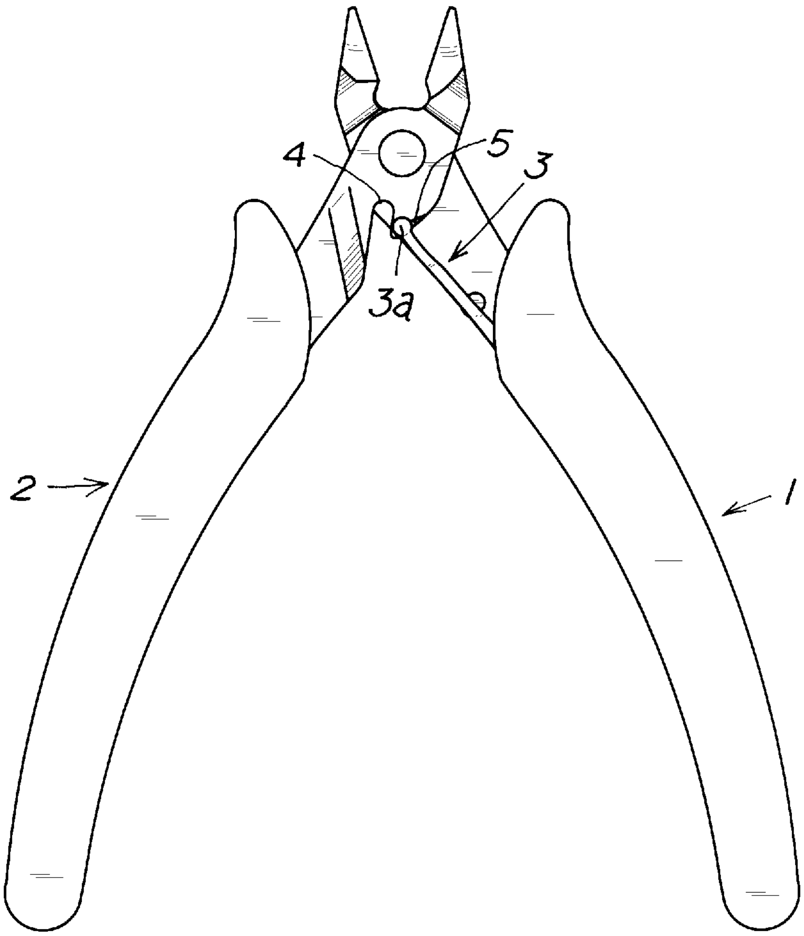
FIG. 3 is an illustrative view of the operation of the essential parts in the working example.
Figure 4:
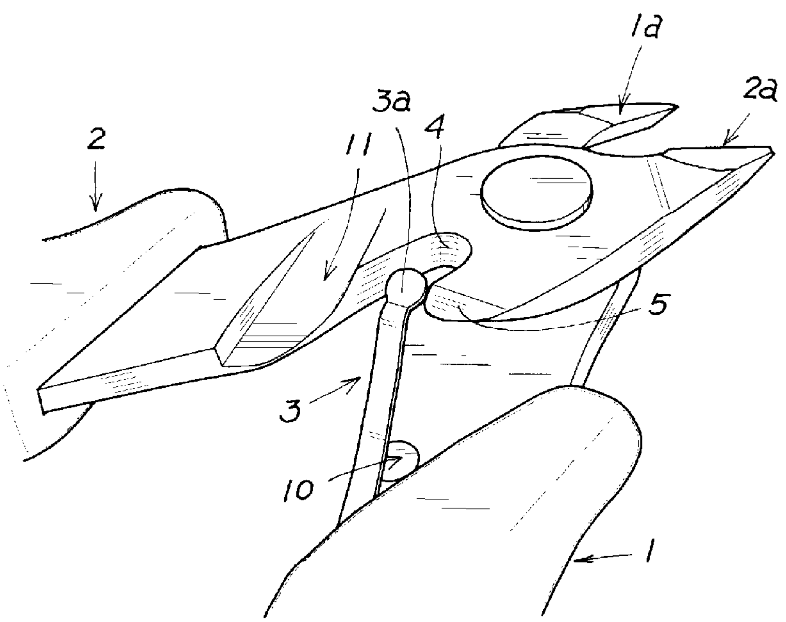
FIG. 4 is an oblique view showing the essential parts in the working example.
Figure 5:
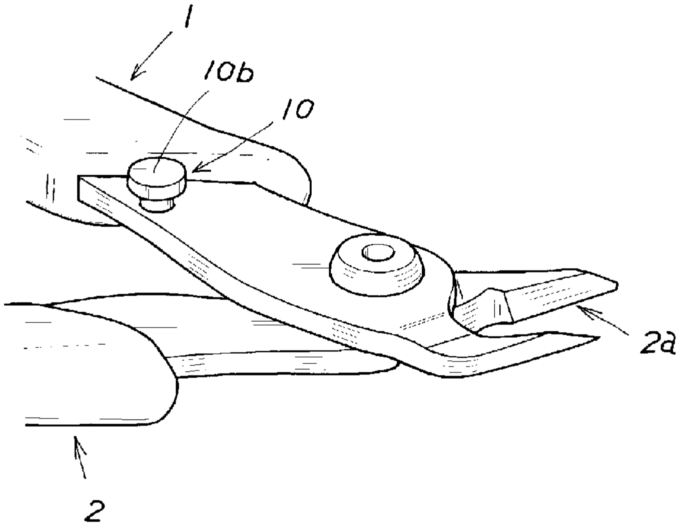
FIG. 5 is an oblique view showing the essential parts in the working example.
Figure 6:
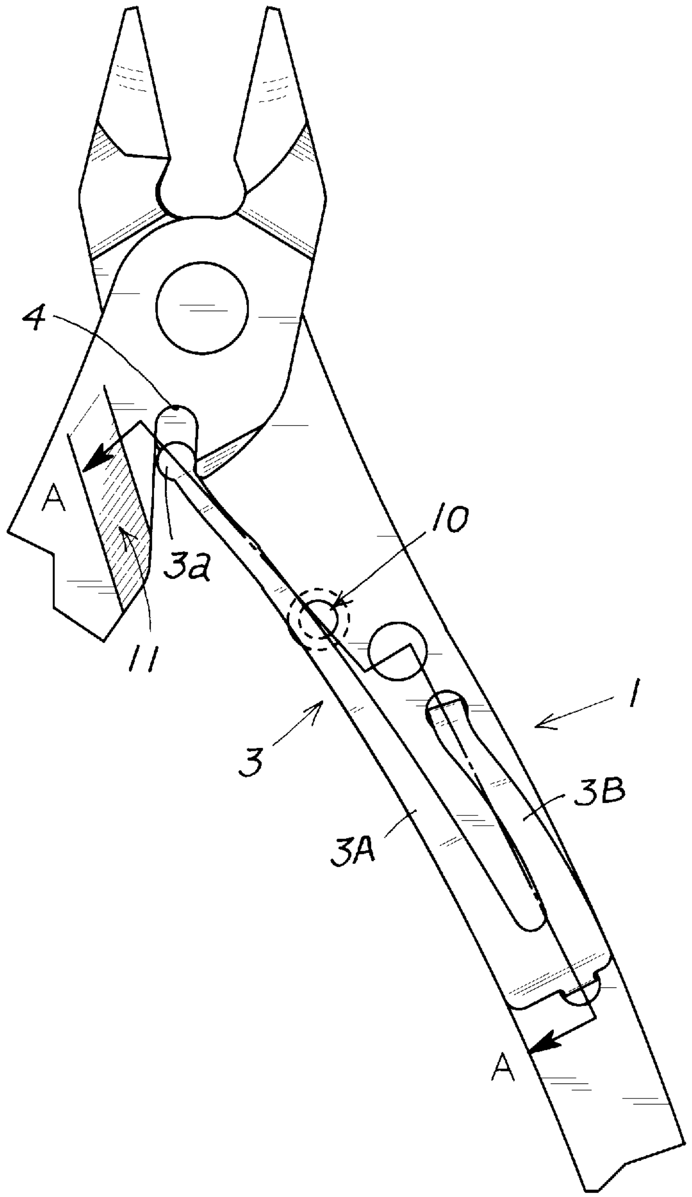
FIG. 6 is an explanatory view of the essential parts in the working example.
Figure 7:
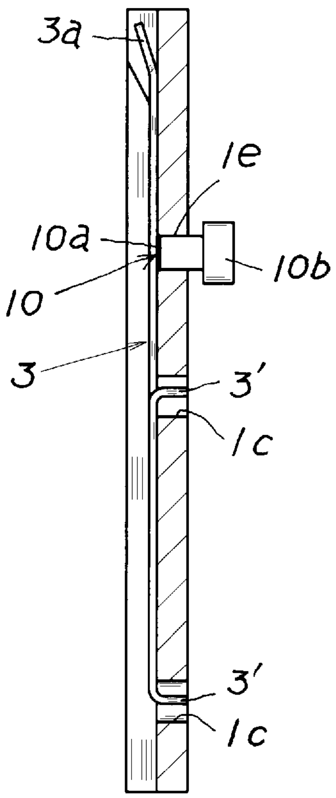
FIG. 7 is an enlarged end view along the line A-A in FIG. 6.
Figure 8:
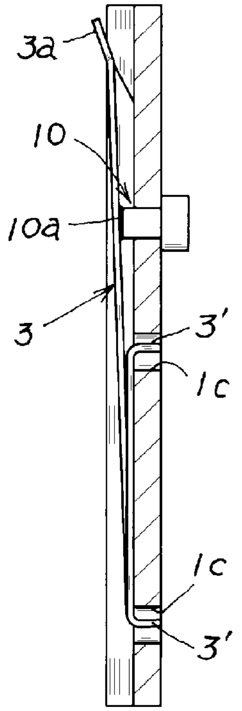
FIG. 8 is an illustrative view of the operation of the essential parts in the working example.

This inclined part 5 is provided on the orbit along which the biasing body 3*a* of the biasing body 3 moves when the first handle part 1*b* and the second handle part 2*b* are opened as shown in FIGS. 3 and 4, inclined upward towards the recess part 4.

In this example, the inclined part 5 is provided as a convex incline, but the inclined part also may be constituted by a flat surface.

Additionally, in this example, the biasing body 3 that biases the first handle part 1*b* and the second handle part 2*b* in the open direction is provided on the first half-body 1.

Specifically, the biasing body 3, as shown in FIGS. 1, 2, 3, and 4, is constituted by a plate-form spring that has the shape of a J as seen in plan view, which is punch-molded from a suitable metal sheet material. In this configuration, the two plate bodies 3A, 3B are linked by a base part, and one of the plate bodies 3A assumes an attached state on the surface of the first half-body 1 and is configured so as to have suitable elasticity in the direction perpendicular to the plate surface and the direction of the plate surface, from the base part to the distal end part 3*a*. The biasing body 3 may be any suitable body, provided that the configuration manifests the characteristics of this example, e.g., a material that has been molded with a mold.

With the biasing body 3, protrusions 3' are provided on the base part and the distal end part of the plate body 3B as shown in FIG. 1, and when in an attached state on the first half-body 1, the protrusions 3' fit into the passage holes 1*c* provided on the first half-body 1, and the biasing body 3 is thereby provided on the first half-body 1 by being retained and latched.

In addition, in this example, as a result of latching of the protrusions 3' in the passage holes 1*c*, a condition is produced in which the biasing body 3 is provisionally fixed onto the first half-body 1, but is completely fixed by insertion into a grip 7 in this state and molding. The symbols 1*d*, 2*d* denote holes that serve to retain the grip 7 through fitting of a part of the grip 7.

The distal end part 3*a* of the biasing body 3 is provided so as to fit and latch in the recess part 4 of the second half-body 2 described above.

Therefore, when the first handle part 1*b* and the second handle part 2*b* are closed, the biasing body 3 generates a return biasing force. The biasing action that arises due to deformation in the plate surface direction of the biasing body 3 when the first handle part 1*b* and the second handle part 2*b* have been closed is the open biasing action whereby the first handle part 1*b* and the second handle part 2*b* are biased in the open direction.

In addition, the distal end part 3*a* of the biasing body 3 is formed in a circular shape as seen in plan view, so that separation from the recess part 4 and sliding over the inclined part 5 from the state of having separated from the recess part 4 can occur smoothly.

In addition, the distal end part 3*a* of the biasing body 3 is formed with a bend in a state whereby it sticks up from the surface of the first half-body 1.

As when the distal end part 3*a* of the biasing body 3 described above was made to have a circular shape as seen in plan view, this is done so that separation from the recess part 4 and sliding over the inclined part 5 from the state of having separated from the recess part 4 can occur smoothly.

The biasing body 3 may also be made from synthetic resin.

In addition, in this example, the unlatching part 10 that allows separation of the distal end part 3*a* from the recess part 4 when the biasing body 3 is pressed is provided on the first half-body 1.

This unlatching part 10 has a configuration in which, as shown in FIGS. 4, 5, 6, 7, and 8, a hole 1*e* that passes through the top and bottom surfaces is provided on the first half-body 1 in a position towards the proximal end from the location of the pivot with the second half-body 2 and a rod-shaped member is provided in this hole 1*e* in a retained state so that it can freely advance and retract.

Consequently, when the proximal end part 10*b* of the unlatching part 10 is pressed and operated to advance, the distal end part 10*a* of the unlatching part 10 acts against the return biasing of the biasing body 3 to press the biasing body 3, the biasing body 3 is pressed by the unlatching part 10 and made to rise up in a direction perpendicular to the plate surface, and the distal end part 3*a* moves in a direction perpendicular to the plate surface. The distal end part 3*a* of the biasing body 3 can separate from the recess part 4 due to pressing by the unlatching part 10. When the pressing-in operation on the unlatching part 10 is released, the unlatching part 10 retracts to its original position due to the return biasing of the biasing body 3.

In this example, a recess-like part is provided on one side of the recess part 4 in the second half-body 2.

This recess-like part is configured as a latching part 11 whereby the distal end part 3*a* of the biasing body 3 is latched when the distal end part 3*a* of the biasing body 3 separates from the recess part 4 as the result of pressing by the unlatching part 10, and, in this state, the two handle parts 1*b*, 2*b* are closed to a predetermined closed position, and pressing of the unlatching part 10 is released.

Figure 9:
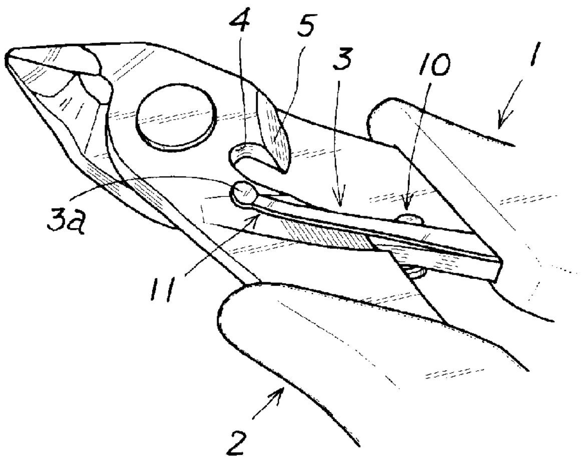
FIG. 9 is an explanatory view of the essential parts in the working example.
Figure 10:
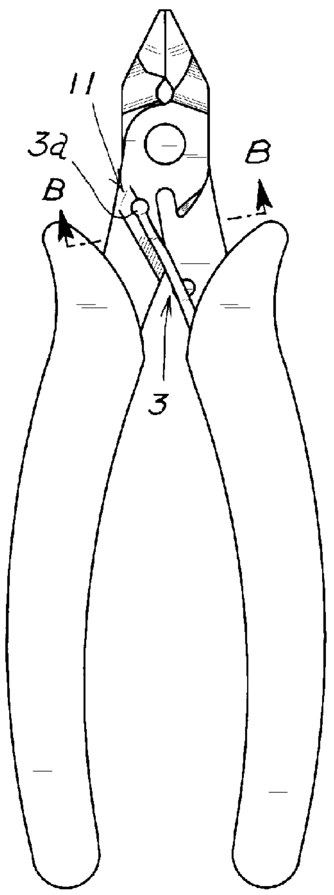
FIG. 10 is an explanatory view of the essential parts in the working example.
Figure 11:
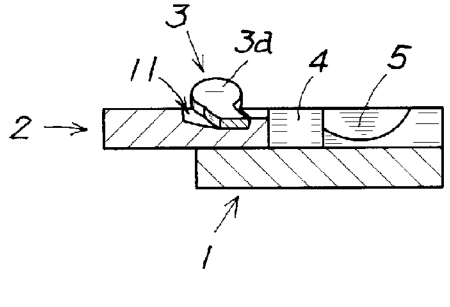
FIG. 11 is a B-B sectional view of FIG. 10.

Consequently, the distal end part 3*a* of the biasing body 3 falls into the latching part 11 and is latched, thereby maintaining closure of the two handle parts 1*b*, 2*b* (refer to FIGS. 9, 10, 11).

In this example, based on the configuration described above, when the first handle part 1*b* and the second handle part 2*b* are gripped and operated to close, the first operating part 1*a* and the second operating part 2*a* close, and when the force of gripping the first handle part 1*b* and second handle part 2*b* is decreased, the first handle part 1*b* and the second handle part 2*b* open due to the open biasing of the biasing body 3, and the first operating part 1*a* and the second operating part 2*a* open along therewith.

In addition, in this example, the recess part 4 that latches the distal end part 3*a* of the biasing body 3 is provided on the second half-body 2. Based on this configuration, the first handle part 1*b* and the second handle part 2*b* are urged open to a predetermined open position by the biasing body 3, and, along therewith, opening of the first handle part 1*b* and the second handle part 2*b* is prevented at this predetermined open position.

Consequently, the first handle part 1*b* and the second handle part 2*b* do not open more than is necessary under normal conditions.

Figure 12:
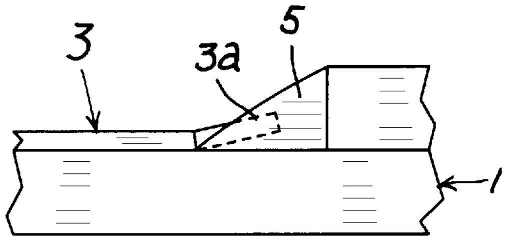
FIG. 12 is an illustrative view of the operation of the essential parts in the working example.
Figure 13:
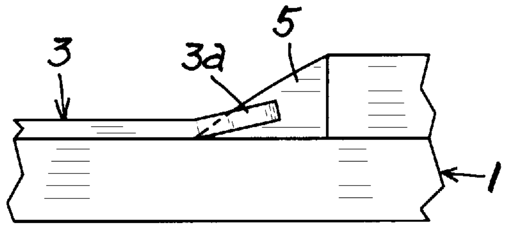
FIG. 13 is an illustrative view of the operation of the essential parts in the working example.

In addition, in this example, when the first handle part 1*b* and the second handle part 2*b* are opened past the predetermined open position by a predetermined force, the distal end part of the biasing body 3 separates from the recess part 4 (FIGS. 3, 12, 13).

Consequently, even when a strong force is applied to excessively open the first handle part 1*b* and the second handle part 2*b*, breakage of the biasing body 3 is prevented to as great an extent as possible by separation of the distal end part 3*a* of the biasing body 3 from the recess part 4.

Figure 14:
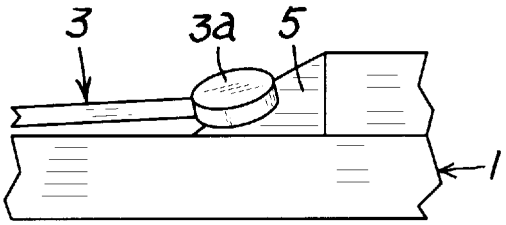
FIG. 14 is an illustrative view of the operation of the essential parts in the working example.
Figure 15:
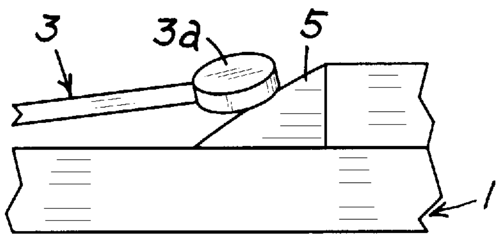
FIG. 15 is an illustrative view of the operation of the essential parts in the working example.
Figure 16:
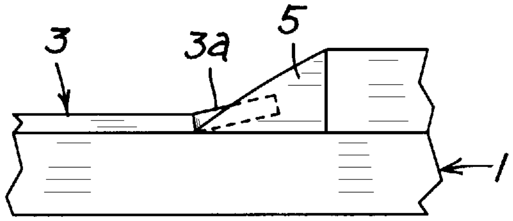
FIG. 16 is an illustrative view of the operation of the essential parts in the working example.

In addition, in this example, an inclined part 5 having a convex curved shape is provided on a side part of the recess part 4 in the second half-body 2, and when the first handle part 1*b* and the second handle part 2*b* are closed from the state in which the distal end part 3*a* of the biasing body 3 has separated from the recess part 4, the distal end part 3*a* of the biasing body 3 slides past the inclined part 5, and the distal end part 3*a* is thereby latched in the recess part 4 (refer to FIGS. 14 to 16).

If the inclined part 5 were absent, then attempting to re-latch the distal end part 3*a* of the biasing body 3 that has separated from the recess part 4 again in the recess part 4 would involve, for example, a troublesome operation in which the first handle part 1*b* and the second handle part 2*b* are closed while supporting the biasing body 3. However, in this regard, simply by closing the first handle part 1*b* and the second handle part 2*b*, the distal end part 3*a* of the biasing body 3, in this example, is automatically latched in the recess part 4 as the result of sliding past the inclined part 5 along with the closing movements of the first handle part 1*b* and the second handle part 2*b*.

Consequently, in order to prevent breakage of the biasing body 3, the distal end part 3*a* that has separated from the recess part 4 can readily and smoothly return to its original state (state in which the distal end part 3*a* is latched in the recess 4), thereby improving operability.

In addition, in this example, when the distal end part 3*a* of the biasing body 3 separates from the recess part 4 as the result being pressed by the unlatching part 10 provided on the first half-body 1, the two handle parts 1*b*, 2*b* are closed to a predetermined closed position in this state, and pressing by the unlatching part 10 is then released, the distal end part 3*a* of the biasing body 3 will fall into the latching part 11 that is provided on the second half-body 2 and will be latched. Closure of the two handle parts 1*b*, 2*b* is maintained as a result of the distal end part 3*a* of the biasing body 3 falling and latching in the latching part 11 (refer to FIGS. 9, 10, 11).

Thus, in accordance with this example, closing and opening operations can be carried out promptly by providing the biasing body 3. Moreover, because the recess part 4 for latching the distal end part 3*a* of the biasing body 3 is provided, excessive opening of the two handle parts 1*b*, 2*b* is prevented. Consequently, the tool is easy to use, and breakage of the biasing body 3 is prevented to as great an extent as possible, because the distal end part 3*a* of the biasing body 3 separates from the recess part 4. Moreover, because the inclined part 5 is provided on a side part of the recess part 4, the biasing body 3 that has separated from the recess part 4 readily and smoothly returns to its original state, resulting in favorable operability.

In addition, in this example, a unlatching part 10 is provided on the first half-body 1 whereby the distal end part 3*a* is made to separate from the recess part 4 by pressing the biasing body 3, and a latching part 11 is provided on the second half-body 2 for latching the distal end part 3*a* of the biasing body 3 when the distal end part 3*a* is made to separate from the recess part 4 by pressing this unlatching part 10, the two handle parts 1*b*, 2*b* are closed to a closed position, and pressing of the unlatching part 10 is then released. A configuration is thereby produced whereby closure of the two handle parts 1*b*, 2*b* is maintained by latching of the distal end part 3*a* of the biasing body 3 in the latching part 11. As a result, for example, when a closed state is to be maintained with the first operating part 1*a* and second operating part 2*a*, this is achieved by utilizing this biasing body 3 to maintain the two handle parts 1*b*, 2*b* in a closed state. Thus, a safe stored state is obtained when the tool is not being used, and the structure can be described as being extremely efficient.

In addition, in this example, the biasing body 3 is an elongated plate-form body that is in an attached state on the surface of the first half-body 1, and the distal end part 3*a* of the biasing body 3 is folded into a state whereby it protrudes from the surface of the first half-body 1. Therefore, providing the biasing body 3 does not impede operation, and moreover, separation from the recess part 4 and traversing up the inclined part 5 occur in an extremely favorable manner.

In addition, in this example, the distal end part 3*a* of the biasing body 3 has a circular shape as seen in plan view, which also allows separation from the recess part 4 and traversing up the inclined part 5 to occur in an extremely favorable manner.

Moreover, in this example, the protrusion 3' that is provided on the biasing body 3 latches in the passage hole 1*c* that is provided on the first half-body 1, and the biasing body 3 is thereby provided on the first half-body 1. Therefore, the superior actions and effects described above can be obtained using a simple structure.

The present invention is not restricted by this example as specific configurations of the constituent elements can be suitably designed.

The invention claimed is:

1. An opening-closing tool, in which a first half-body having a first operating part on a distal end and a first handle part on a proximal end and a second half-body having a second operating part on the distal end and a second handle part on the proximal end have a cross-over pivot, and a biasing body that abuts the second half-body and provides an open bias on the two handle parts is provided on the first half-body, the opening-closing tool characterized in being configured so that a recess part for latching a distal end part of the biasing body is provided on the second half-body, and, as a result of latching of the biasing body and the recess part, the two handle parts are biased open up to a predetermined open position, and, along therewith, opening of the two handle parts is prevented at this predetermined open position; being configured so that an unlatching part for allowing separation of the distal end part of the biasing body from the recess part is provided on the first half-body, and the second half-body is provided with a latching part for latching the distal end part of the biasing body when the distal end part of the biasing body is made to separate from the recess part by the unlatching part and the two handle parts have closed to a predetermined closed position, the two handle parts being kept closed by latching of the distal end part of the biasing body on the latching part; and being configured so that the biasing body has a configuration in which two plate bodies are linked with a base part, one of the plate bodies being in an attached state at the surface of the first half-body, and the distal end part of the plate body latching on, or separating from, the recess part, and the unlatching part has a configuration in which the one of the plate bodies is pressed from the back surface, and, due to this pressing by the unlatching part, the distal end part that is latched to the recess part is separated from the recess part in opposition to the elasticity of the plate body.

2. The opening-closing tool according to claim 1, characterized in being configured so that one of the plate bodies is latched and held on the latching part due to the elasticity of the one of the plate bodies.

3. The opening-closing tool according to claim 2, characterized in being configured so that a recess-like part is provided as the latching part on one side of the recess part on the second half-body.

4. The opening-closing tool according to claim 1, characterized in being configured so that a recess-like part is provided as the latching part on one side of the recess part on the second half-body.

5. The opening-closing tool according to any of claims 1 to 3, characterized in being configured so that the distal end part of the biasing body is provided so as to separate from the recess when the two handle parts are opened additionally from a predetermined open position with a predetermined force, an inclined part is provided on another side of the recess on the second half-body, and when the two handle parts are closed from a state in which the distal end part of the biasing body has separated from the recess, the distal end part of the biasing body slides on the inclined part, and the distal end part latches on the recess.

* * * * *